Patented Jan. 15, 1952

2,582,386

UNITED STATES PATENT OFFICE 2,582,386

BRIQUETTES AND METHOD OF MAKING SAME

Gustav Komarek and Walter J. Chapman, Chicago, Ill., assignors to Komarek-Greaves & Company, Chicago, Ill., a corporation of Illinois No Drawing. Application August 4, 1950, Serial No. 177,757

8 Claims. (Cl. 75—3)

This invention relates to briquettes and to methods of manufacturing the same.

It has long been a problem in the steel industry, particularly, in the case of blast furnace operations, to return the very substantial amounts of flue dust to the furnace in a convenient and useful form. We have discovered that when flue dust is mixed with an inorganic ammonia compound, preferably, ammonium sulfate and water, and the mixture pressed between rolls, that highly satisfactory briquettes are formed. In the carrying out of the process, it is preferable to introduce into the mixture a suitable clay, such as bentonite, which will give strength to the briquettes as discharged from the rolls and maintain them against disintegration until the exothermic reaction, apparently due to the catalytic action of the ammonium sulfate, has been completed and the flue dust is firmly bound into a hard, abrasion and weather-resistant body.

We have further discovered that iron ore fines, such as hematite ($Fe_2O_3$) and magnetite ($Fe_3O_4$) may be formed into satisfactory briquettes by mixing the same with the flue dust in mixtures, as described above. For example, these iron ores can be satisfactorily briquetted with flue dust in proportions of about 10 to 90% iron ore and about 90 to 10% flue dust.

In carrying out this invention a mixture is made in a masticating machine of flue dust, or a mixture of flue dust and iron ore, in any desired proportions, with about 6% water and about one-half of 1% sulfate of ammonia. It is desirable to add a clay, preferably bentonite, in amount of about 3%. After the constituents are thoroughly mixed the mixture is fed to a suitable apparatus and briquetted, for instance, in accordance with the application of Gustav Komarek, Serial No. 206,035, filed January 15, 1951. The briquetting pressure rolls are unheated and it is observed, as the briquettes are discharged, that they are quite hot due to an exothermic reaction which takes place. The presence of the clay or bentonite is desirable since it exerts an initial binding action to prevent crumbling of the briquettes in handling until the exothermic reaction has been completed, after which the briquettes are at optimum strength and resistant to weathering, as well as handling and abrasion.

While we have referred herein to ammonium sulfate, it is to be understood that other inorganic ammonium compounds may be used, but we have found that ammonium sulfate is, by far, the more preferable. Other inorganic ammonium compounds which may be used are ammonium carbonate, ammonium chloride and ammonium hydroxide. The amount of inorganic ammonium compound which may be employed may be varied from about .25% to about 1%.

The amount of water added to or present in the mixture can be within the range of about 4% to about 10%.

Also, while we have mentioned bentonite as the preferable clay and initial binding agent, other clays may be used, such as Kaolin and the various silicates of aluminum and calcium. The clay is employed in the range of about 1½ to 3½%.

The briquettes produced in accordance with this invention may be made in various sizes on the briquetting pressure rolls and, as indicated, possess substantial strength so that they are resistant to crumbling and abrasion and, therefore, provide an ideal form for returning the flue dust and iron ore fines to the furnace.

We claim:

1. A briquette consisting essentially of flue dust, clay in amount of about 1½ to 3½%, and an inorganic ammonia compound in amount of about .25 to 1%.

2. A briquette consisting essentially of from about 90 to 10% flue dust and from about 10 to 90% iron ore fines, clay in amount of about 1½ to 3½% on the basis of the combined dust and fines and an organic ammonium compound in amount of about .25 to 1% on the basis of the combined dust and fines.

3. A briquette product produced from the composition consisting essentially of flue dust, clay in amount of about 1½ to 3½%, and an inorganic ammonia compound in amount of about .25 to 1%.

4. A briquette product produced from the composition consisting essentially of from about 90 to 10% flue dust and from about 10 to 90% iron ore fines, clay in amount of about 1½ to 3½% on the basis of the combined dust and fines and an inorganic ammonium compound in amount of about .25 to 1% on the basis of the combined dust and fines.

5. A briquette according to claim 1 in which the ammonium compound is ammonium sulfate.

6. A briquette according to claim 2 in which the ammonium compound is ammonium sulfate.

7. A briquette according to claim 3 in which the ammonium compound is ammonium sulfate.

8. A briquette according to claim 4 in which the ammonium compound is ammonium sulfate.

GUSTAV KOMAREK.
WALTER J. CHAPMAN.

REFERENCES CITED

The following references are of record in the file of this patent:

UNITED STATES PATENTS

| Number | Name | Date |
| --- | --- | --- |
| 1,111,919 | Paterson | Sept. 29, 1914 |
| 1,428,061 | Rouse | Sept. 2, 1922 |